United States Patent Office 3,428,470
Patented Feb. 18, 1969

3,428,470
BIOLOGICAL SPECIMEN IN A CROSS-LINKED WATER-SWELLABLE ACRYLAMIDE TYPE RESIN AND THE INCORPORATION OF THE SPECIMEN THEREIN
William M. Welsh and Bobby L. Atkins, Lake Jackson, Tex., assignors to The Dow Chemical Company, Midland, Mich., a corporation of Delaware
No Drawing. Filed June 9, 1966, Ser. No. 556,262
U.S. Cl. 117—3    6 Claims
Int. Cl. B65b 29/00; A61l 13/00

This invention relates to systems for the immobilization of biological specimens.

Biological specimens are normally preserved in aqueous solutions. Such preserved specimens are relatively free to move about in the containers during shipment or other routine handling operations. The specimens are thus frequently damaged or fragmented due to random motion within the container.

According to the present invention, preserved biological speciments are immobilized (in a form which does not obscure the detailed observation of the specimens) by gelling the aqueous preservative solution surrounding the specimens.

The preservation solution is gelled by the addition of a cross-linked water-swellable polymeric material in combination with a suitable surfactant.

The water-swellable polymeric materials may be cross-linked with alkylidene bis-acrylamides of the formula $$\begin{matrix} & O & R_2 \\ & \| & | \\ H-N-C-C&=&CH_2 \\ & | & \\ R_1-C-H & & \\ & | & \\ H-N-C-C&=&CH_2 \\ & \| & | \\ & O & R_3 \end{matrix} \quad (I)$$

in which $R_1$ is a hydrogen atom or a lower alkyl group of form 1 to 4 carbon atoms such as a methyl, ethyl, n-propyl, i-propyl, n-butyl, i-butyl, tert.-butyl or sec.-butyl group (represented by the symbol $-(C_pH_{2p})-H$ in which $p$ is an integer of from 0 to 4) and each of $R_2$ and $R_3$ is independently selected from the group consisting of the hydrogen atom and a methyl group. The preferred cross-linking agents are the methylene bis-acrylamide compounds (i.e., $R_1=H$ in Formula I). Other suitable alkylidene bis-acrylamide cross-linking agents are described in U.S. Patent 3,046,201 to White et al. and methods of preparing water-swellable polymers are disclosed in U.S. Patent 3,247,171. The teachings of both of these patents are incorporated herein by reference. Other cross-linking agents which may be used include divinylbenzene, divinyl ether of diethylene glycol and diallyl sucrose. The preferred cross-linking agents are the water-soluble cross-linkers. Only a minor amount of cross-linking agent is used. For example, the amount of cross-linking agent may vary from about 300 to 3000 parts per million (preferably from about 1000 to 2000 p.p.m.) based upon the total weight of the polymeric material which is to be cross-linked.

The polymeric materials which are cross-linked to form water-swellable polymers may be prepared from monomers of the formula

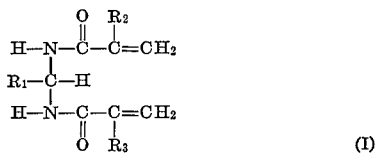

wherein R is a hydrogen atom or a methyl group and Z is selected from the group

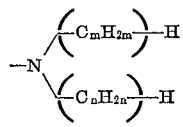

(each of $n$ and $m$ is independently an integer of from 0 to 4) and —OM in which M is hydrogen, an alkali metal or the ammonium group. Any compound of Formula II may be homopolymerized with itself or polymerized with one or more different compounds represented by Formula II and simultaneously reacted with a cross-linking material. Examples of polymeric materials prepared from monomers of Formula II which may be a cross-linked during the polymerization with compounds represented by Formula I thus include polyacrylates, polyacrylamides, polymethacrylamides, acrylate-acrylamide copolymers, acrylate-methacrylamide copolymers, methacrylate - acrylamide copolymers, methacrylate-methacrylamide copolymers as well as acrylic acid-acrylate-acrylamide terpolymers and other suitable polymeric combinations. The monomers are combined with the cross-linking agent I at any temperature at which the ingredients are liquid (generally at room temperature). The monomeric materials may also be dissolved (in water or other suitable solvent) and the cross-linking agent I added to the solution. When different monomers are to be polymerized and cross-linked, any convenient ratio of the reacting monomers or the water-soluble linear polymers derived from these monomers may be employed. A preferred subclass of monomeric materials which may be cross-linked and polymerized with compounds I include mixtures of alkali metal acrylates (and/or methacrylates) with acrylamide (and/or methacrylamide). The weight ratio of alkali metal acrylate (or methacrylate) to acrylamide (or methacrylamide) is preferably from about 3:1 to 1:5, respectively.

The surfactant which is combined with the water-swellable cross-linked polymer may be any water-soluble (preferably non-ionic) detergent. Suitable surfactants include the reaction products obtained by combining ethylene oxide and a nonyl phenol in a mole ratio of from about 5 to 60 moles of ethylene oxide per mole of nonyl phenol. The amount of surfactant which is combined with the cross-linked polymer may vary from about 1 to 50 percent by weight based upon the total weight of the cross-linked polymer including the weight of the surfactant. It is believed that the surfactant function mainly to slow the gelling action of the water-swellable polymers. This permits the specimen to be moved and adjusted before the preservation medium has been set.

A special advantage of the present invention is that aqueous solutions of preservatives (especially those containing formaldehyde) may be gelled without the formation of bubbles. Bubbles trapped in the gel tend to obscure the visual outlines of the specimen and render the gelled product unsuitable for exhibition purposes. If the surfactant is added to the aqueous preservative solution either before or after the gelling agent has been added, the amount of bubble formation is not significantly reduced. Preservative solutions containing up to 40 percent by weight of formaldehyde may be successfully gelled according to the invention. The method is suitable for any specimen of the animal kingdom which may be preserved against decomposition with conventional preservative or fixing agents such as formaldehyde, organometallic preservatives and phenolic-type preservatives.

In a typical embodiment of the invention, a biological specimen (which may include any member of the animal kingdom or a sample of the tissue, organs or other preservable part of such specimen) which has been preserved (or fixed) with a suitable chemical preservative (ordinarily formaldehyde) is placed in a container filled with an aqueous medium (for example, dilute aqueous formaldehyde). The cross-linked water-swellable polymer (combined with a surfactant) is added (usually in the form of a finely divided solid) and the specimen positioned so as not to contact the walls of the container. The aqueous solution forms a clear gel with little or no bubble production and the resulting package may be shipped without damage to the specimen or can be employed for exhibition purposes. If the gelled sample is shipped, the specimen may be removed conveniently from the container undamaged and intact. Since the gel which forms is transparent, the specimens may be used directly as exhibits when the aqueous solution is gelled in a clear glass, plastic, or other suitable container. The water-swellable polymer may be combined with surfactant and pelletized in various sizes and shapes, thus permitting the correct amount of material to be used for a given volume of liquid which is to be gelled.

The following is submitted for the purpose of illustration only and is not to be construed as limiting the scope of the invention in any way.

EXAMPLE I

A large garden spider which had been previously fixed (preserved) with formaldehyde was placed in a four ounce glass display bottle containing 90 milliliters of 0.5 percent (weight) formaldehyde. The specimen was suspended in the center of the container with a small stainless steel wire. A 0.5 gram sample of a solid copolymer in powder form (particle size: 100–300 microns; average) of acrylamide and sodium acrylate (60 parts by weight of acrylamide to 40 parts by weight of sodium acrylate) which was cross-linked by the addition of 1750 p.p.m. (based upon the weight of the copolymer) of N,N'-methylene bis-acrylamide was added to the aqueous formaldehyde solution. The cross-linked polymer particles had been previously coated with surfactant by mixing (at approximately 80° C.) 50 grams of the cross-linked polymer with 10 grams of a non-ionic surfactant formed by reacting a nonyl phenol with ethylene oxide in a mole ratio of about 1:9, respectively, until the polymer particles were uniformly coated and mixed with the surfactant. Five minutes after the addition of the surfactant-polymer mixture, the wire was removed and the specimen remained suspended in the gelled solution. The sealed container could be moved, turned over, shaken and vibrated without dislocation of the preserved specimen. The specimen was easily removed from the gelled liquid without damage to the specimen.

Other similar water-swellable polymeric materials may be combined with suitable surfactants (such as oxyalkylated nonyl phenol) and employed as illustrated in Example I.

We claim as our invention:

1. A method of packaging a preserved specimen of an animal or an organ thereof which comprises immersing said specimen in an aqueous medium and gelling said medium with a mixture of a surfactant and a water swellable polymeric material produced by polymerizing at least one monomer of the formula

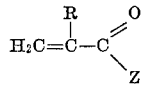

wherein
(a) R is selected from the group consisting of hydrogen atom and the methyl group: and
(b) Z is selected from the group consisting of
(i) the group

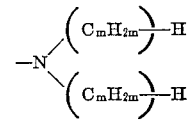

in which each of $n$ and $m$ is independently an integer of from 0 to 4, and
(ii) the group —OM in which M is selected from the group consisting of the hydrogen atom, an alkali metal and ammonium and wherein said swellable polymeric material is cross-linked by a water-swellable polymeric material which has been cross-linked with a member selected from the group consisting of divinylbenzene, the divinyl ether of diethylene glycol, diallyl sucrose and an alkylidene bis-acrylamide.

2. The method of claim 1 wherein the alkylidene bis-acrylamide is a methylene bis-acrylamide.

3. The method of claim 1 wherein the biological specimen is preserved in aqueous formaldehyde and the water-swellable polymeric material which is cross-linked is prepared from at least one monomer of the formula

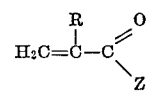

wherein:
(a) R is selected from the group consisting of the hydrogen atom and the methyl group; and
(b) Z is selected from the group consisting of
(i) the group

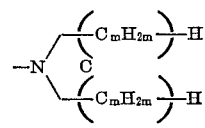

in which each of $n$ and $m$ is independently an an integer of from 0 to 4, and
(ii) the group —OM in which M is selected from the group consisting of the hydrogen atom, an alkali metal and ammonium.

4. The method of claim 3 wherein the cross-linking agent is divinylbenzene.

5. The method of claim 3 wherein the cross-linking agent is a compound of the formula

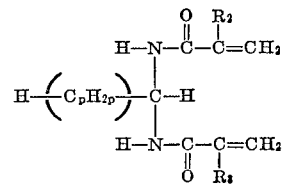

wherein:
(a) $p$ is an integer of from 0 to 4, and
(b) each of $R_2$ and $R_3$ is independently selected from the group consisting of the hydrogen atom and the methyl group.

6. A packaged preserved biological specimen prepared in accordance with the process of claim 1.

(References on following page)

References Cited

UNITED STATES PATENTS

| | | | |
|---|---|---|---|
| 2,881,155 | 4/1959 | Hankins | 260—29.6 |
| 3,050,785 | 8/1962 | Cunningham | 264—271 |
| 3,083,118 | 3/1963 | Bridgeford | 117—47 |
| 3,157,964 | 11/1964 | Ferguson et al. | 117—3 |
| 3,247,171 | 4/1966 | Walker et al. | 260—80.3 |
| 3,314,909 | 4/1967 | Whitfield | 260—29.6 |
| 3,281,263 | 10/1966 | Priesing et al. | 260—29.6 |

NORMAN G. TORCHIN, *Primary Examiner.*

D. LEVY, *Assistant Examiner.*

U.S. Cl. X.R.

008—94.11; 35—20